Aug. 27, 1957     J. GREAVES     2,804,156
ROCK PICKER

Filed Nov. 26, 1954     2 Sheets-Sheet 1

INVENTOR
Joseph Greaves.
BY
ATTORNEY

Aug. 27, 1957   J. GREAVES   2,804,156
ROCK PICKER
Filed Nov. 26, 1954   2 Sheets-Sheet 2
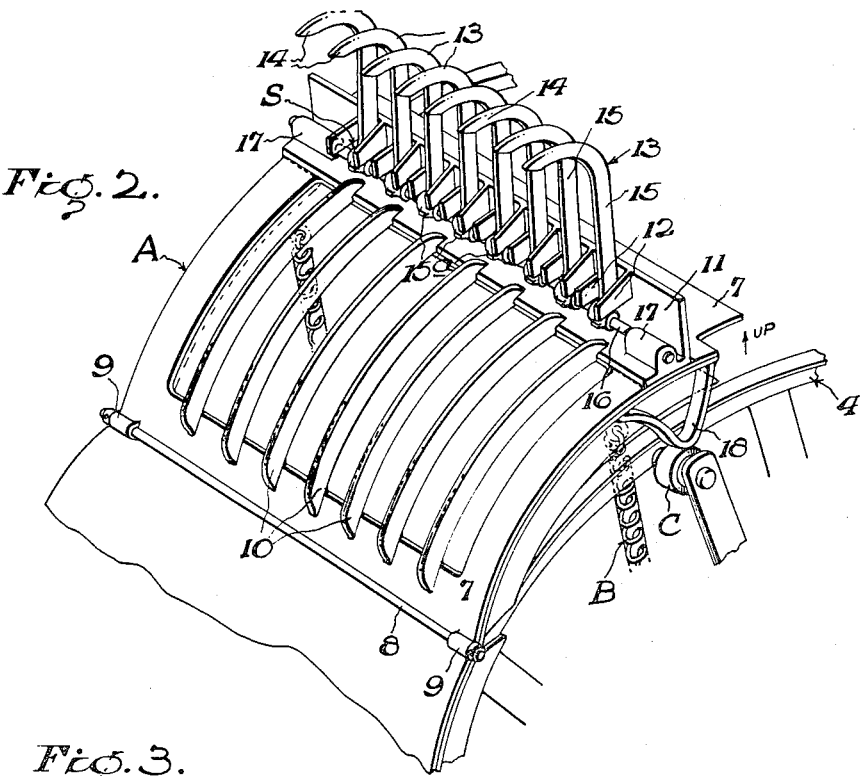
Fig. 2.
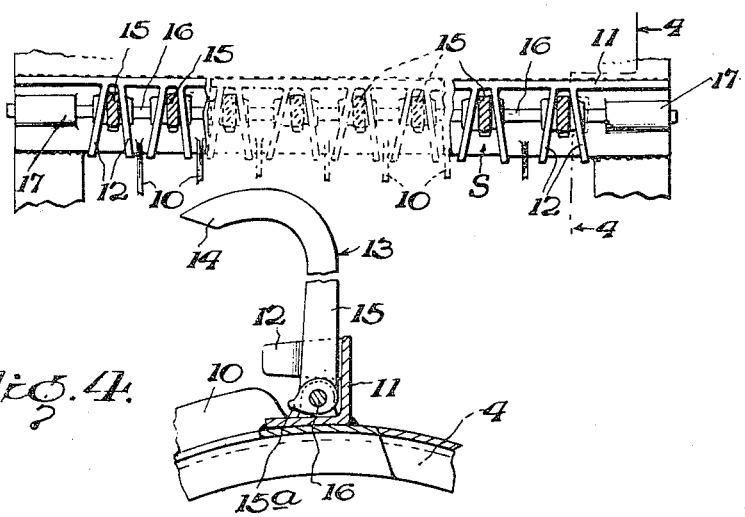
Fig. 3.
Fig. 4.
INVENTOR
Joseph Greaves
BY
ATTORNEY United States Patent Office 2,804,156
Patented Aug. 27, 1957

2,804,156
ROCK PICKER
Joseph Greaves, Toston, Mont.
Application November 26, 1954, Serial No. 471,281
4 Claims. (Cl. 171—87)

This invention relates to rock pickers for removing rocks from tillable soil.

One of the objects of the invention is to provide a rock picker which may be drawn over the surface of the earth by a tractor or other suitable prime mover and whose distinctive feature resides in the provision of a power driven carrier element mounted on a horizontal axis and having at the surface thereof a plurality of rock picking units which include picker hooks for lifting the rocks from the earth, elevating them, and discharging the same into a collecting bin in the rear of the carrier.

Another object of the invention is to provide a carrier, which may be round or square, with a series of rock picking units each of which includes a frame carrying the picker hooks and a grate, each of said frames being pivoted transversely to the surface of the carrier and spring tensioned to be held against the face thereof except at the time a unit approaches the collecting bin, whereupon the unit, by virtue of cooperating cam means on the unit and the chassis or body of the carrier causes the unit to be projected from the drum against spring tension to release and throw trapped or impaled rocks into the collecting bin.

With the above and other objects in view, the invention constitutes in the combination and arrangement of parts hereinafter more fully described and claimed.

A preferred and practical embodiment of the invention is shown in the accompanying drawings, in which:

Fig. 2 is a perspective view of one of the rock picker units.

Fig. 3 is a detailed top plan view of the member in which the shanks of the picker hooks are mounted.

Fig. 4 is a cross-sectional view taken on line 4—4 of Fig. 3.

Fig. 5 is an enlarged detail view illustrating a modified form of mounting for the shanks of the picker hooks.

Similar reference characters designate corresponding parts in the several figures of the drawings.

Figure 1:
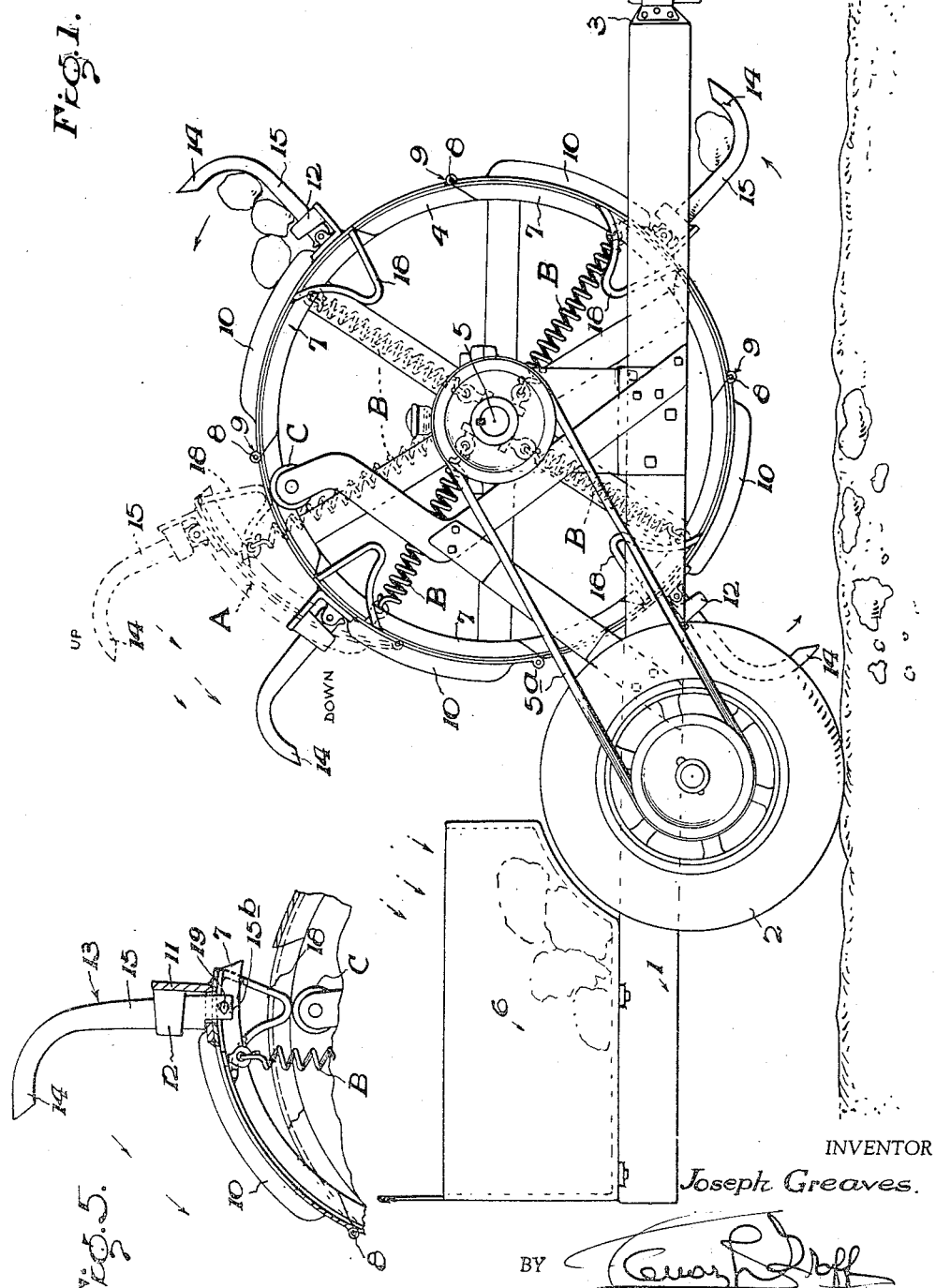
Fig. 1 is a side elevation of the improved rock picker.

As will be observed from Fig. 1 the present apparatus includes a chassis 1 provided with wheels 2 to be drawn forwardly by the draft end 3. Between the wheels 2 and the draft end 3 there is provided a power-driven carrier 4 which may be round and rotated at any desired speed on the shaft 5 by power received from any suitable source, such for example, as with a conventional drive 5a from one of the wheels 2. The carrier 4 moves counterclockwise and is located forwardly of a collecting bin 6 which receives rocks discharged from the picker units designated generally as A.

As will be seen from Fig. 1, the picker units A may be located at appropriate angular distances about the carrier. Each of the units A is urged toward the axis of the carrier by a spring B so as to normally be held with stability relative to the carrier when picking up rocks. As will be later explained, as the units A approach the bin 6 they are projected away from the surface of the carrier by an appropriate cam on the unit engaging the fixed abutment C suitably attached to the frame or chassis 1.

The units A, as will be more clearly apparent from Figs. 2, 3, and 4, each comprise a frame 7 which is mounted on a rod 8 or the like supported in suitable eyes 9 on the surface of the carrier. The open central portion of the frame 7 is provided with a series of grate bars 10 which will permit earth and small stones to sift back toward the earth while still supporting stones to be removed from the earth.

The end of the frame 7 opposite the rod 8 is provided with a transversely disposed angle member 11 whose bottom web is secured to the frame and the upstanding flange is provided with a plurality of tapered sockets S, formed, for example, by the divergently related members 12. The narrow ends of these sockets are located near the upstanding flange of the member 11. These sockets movably receive the shanks of the picker hooks 13, as will be later more apparent.

It will be observed from the drawings that the hooks 13 have a curved rock-engaging and lifting tip portion 14 and a shank 15. In Figs. 3 and 4 the shanks 15 of the picker hooks are shown as being mounted in the sockets S and their lower portions are provided with openings for relatively loosely receiving a supporting pivot rod 16 which is common to all of the hooks. As shown in Fig. 4, the end of the shanks 15 may be provided with an abutment foot 15a to prevent the hooks from falling too far out of the sockets S. The ends of the pivot rod 16 are secured in suitable brackets 17 at opposite ends of the angle member 11. As shown in Fig. 3, the lower end of each shank 15 is provided with an offset abutment 15a to engage the horizontal flange of the angle 11 to prevent the hooks from falling too far forwardly.

The openings in the shanks of the picker hooks are of sufficient diameter to loosely engage the rod 16. Thus, when the hooks 13 move downwardly to engage rocks and also while they are moving upwardly to a point just before reaching the zone of the bin 6, the shanks will be wedged in the narrow end of the sockets S. Thus, the picker hooks will be held relatively rigid when picking up rocks and carrying or lifting them toward the bin. However, when the unit is to discharge its rocks into the bin, the cam element 18 on the frame 7 will engage the fixed abutment C and project the discharging unit away from the surface of the frame 4 against the tension of spring B, as shown in dotted lines in Fig. 1. Therefore, when the unit is in discharging position, the shanks 15 of the picker hooks 13 are free to move to the wide end of the sockets or slots S, and because they are relatively loosely mounted on the rod 16, they will be free to separate more or less laterally a sufficient amount to permit any rocks wedged between the hooks to be released therefrom and thrown into the bin.

Any earth or small stones that are carried up from the earth surface to the point where the unit discharges into the bin will fall through the grate 10 and return to the surface of the earth, thereby avoiding mixing the rocks to be removed with otherwise usable earth.

Fig. 5 illustrates the picker hooks 13 whose shanks 15 are provided at their lower ends with a reduced portion 15b projecting through a related slot in the relatively horizontal flange of the angle 11 and secured therein by a key 19 or the like. The reduced portion 15b provides, in effect, opposite shoulders which limit the rocking or tilting movement of the picker hooks.

The essential feature of the invention is that it provides a rotatable carrier which may be in the form of a circular frame, or even a rectangular frame without departing from the spirit or the scope of the invention, the said frame having mounted therein the pivotally mounted units A carrying the picking elements 13. It will of course be understood that the picking units, regardless of their particular shape or form are held to the frame by the spring B. In each instance, when the picker hooks 13 engage the rocks on the surface of the ground they are held relatively stable in their mounting, but when the rocks are to be projected into the receptacle they have sufficient lateral freedom to permit rocks wedged between any pair of hooks to be released.

From the foregoing it will be seen that the present invention provides a carrier having a plurality of angularly spaced picker units thereabout, said units in their picking cycle following a generally circular path outwardly of the carrier, but which, at the end of their picking and lifting cycle are projected tangentially away from the carrier automatically to throw rocks in the collecting bin.

I claim:

1. A rock picker including a wheeled chassis having draft means at one end, a rock collecting bin at the rear end, a rotatable carrier on the chassis and located forwardly of the bin, a plurality of rock picking units pivotally mounted at one end on the carrier, spring means connected to said carrier and the free ends of said units for urging the free ends of said units toward the carrier, each of said units including a frame, a grate carried by the frame, a plurality of picker hooks having their shank ends pivotally mounted at the free end of the unit, means on the frame at the shank ends of said picker hooks for gripping said shank ends as they move earthward to pick up rocks and freeing said shank ends as the hooks approach the bin to release rocks wedged between them, and, cooperating cam means on the chassis and each unit for tilting said units as they approach the bin to discharge rocks carried by the picker arms into the bin.

2. A rock picker according to claim 1 wherein the frame of each unit is connected at one end to the carrier by a transverse pivot rod, and the shanks of the rock picker hooks are also pivotally connected to the other free end of the frame by a common pivot rod.

3. A rock picker according to claim 1, wherein the means for gripping and freeing the shank ends of the picker hooks includes an angle member having one flange secured to the frame and its other flange extending outwardly, means on said member forming a socket for receiving the shank end of each hook, said socket being narrow at its rear end to embrace the sides of the shanks while the same are picking up rocks and being wider at its forward end to free the shanks as they approach the collecting bin.

4. A rock picker according to claim 1 wherein the cam means includes an abutment fixed to the chassis and supported near the peripheral edge of the carrier, and a cam carried by the lateral edge of the unit and directed radially inwardly toward the abutment.

References Cited in the file of this patent

UNITED STATES PATENTS 1,425,078     Clark _____ Aug. 8, 1922